(12) United States Patent
Hecht

(10) Patent No.: US 6,276,879 B1
(45) Date of Patent: Aug. 21, 2001

(54) CUTTING HEAD FOR MOUNTING ON A TOOL HOLDER IN A SELF-CLAMPING MANNER

(75) Inventor: Gil Hecht, Hadera (IL)

(73) Assignee: Iscar Ltd., Migdal Tefen (IL)

( * ) Notice: Subject to any disclaimer, the term of this patent is extended or adjusted under 35 U.S.C. 154(b) by 0 days.

(21) Appl. No.: 09/372,648

(22) Filed: Aug. 12, 1999

(30) Foreign Application Priority Data

Aug. 13, 1998 (IL) ................................................. 125766

(51) Int. Cl.⁷ ............................ B23C 5/22; B23B 31/107
(52) U.S. Cl. ........................... 409/234; 409/232; 279/93; 403/350; 408/232; 408/713
(58) Field of Search .................................. 409/234, 232; 279/93; 403/348, 350, 374.1, 351, 352, 343, 360; 408/232, 231, 226, 713, 239 R, 238, 227; 407/34

(56) References Cited

U.S. PATENT DOCUMENTS

| | | | |
|---|---|---|---|
| 1,884,601 | * 10/1932 | De Witt | 403/348 |
| 2,113,821 | * 4/1938 | Baash | 403/343 |
| 2,158,120 | * 5/1939 | Hirschberg | 403/343 |
| 3,548,688 | * 12/1970 | Kuch | 408/230 |
| 3,860,209 | * 1/1975 | Strecker | 403/348 |
| 4,658,915 | * 4/1987 | Goris et al. | 403/343 |
| 4,668,119 | * 5/1987 | Galletti | 403/343 |
| 5,904,455 | 5/1999 | Krenzer et al. | |
| 5,957,631 | * 9/1999 | Hecht | 408/226 |
| 5,971,673 | * 10/1999 | Berglund et al. | 408/231 |

FOREIGN PATENT DOCUMENTS

| | | |
|---|---|---|
| 0 118 806 | 9/1984 | (EP). |
| 28385 | * 12/1912 | (GB) ........................... 279/93 |
| WO 96/11079 | 4/1996 | (WO). |
| WO 98 10881A | 3/1998 | (WO). |

OTHER PUBLICATIONS

The Machinery's Handbook, 25th ed., New York, p. 904, 1996.*

* cited by examiner

Primary Examiner—A. L. Wellington
Assistant Examiner—Erica Ergenbright
(74) Attorney, Agent, or Firm—Pennie & Edmonds LLP

(57) ABSTRACT

A replaceable cutting head is adapted for co-axial coupling thereof, along a coupling axis, with a tool shank in a self-clamping fashion. Both the cutting head and the tool shank have a mounting portion comprising a centering section and a positioning section. The centering section is formed with a peripheral centering surface which extends circumferentially with respect to the coupling axis and has a substantially conical shape at least at two portions thereof. The positioning section has at least two peripherally disposed and circumferentially extending and spaced apart positioning surfaces adapted for the provision of an axial support of the cutting head on the tool shank. Each positioning surface is inclined with respect to the coupling axis so that an axial distance therefrom to a broad end of the peripheral centering surface increases in a direction generally corresponding to the direction of cutting forces acting on the cutting edge during a cutting operation. One of the positioning and centering sections is formed with at least two circumferentially spaced apart fixation wings with, respectively, either the positioning surfaces and or the portions of the centering surface belonging thereto.

9 Claims, 9 Drawing Sheets

CUTTING HEAD FOR MOUNTING ON A TOOL HOLDER IN A SELF-CLAMPING MANNER

FIELD OF THE INVENTION

The present invention refers to a cutting tool assembly comprising a replaceable cutting head and tool shank on which the cutting head is releasably and co-axially mounted in a substantially self-clamping manner.

BACKGROUND OF THE INVENTION

The present invention particularly refers to a cutting tool assembly of the above-specified kind for use in rotary cutting operations, such as e.g. milling, where a rotary torque is transferred from a tool shank to a cutting head mounted thereon.

When rotary cutting tools of the above kind are designed to work at small cutting diameters, it is often desirable that their cutting head be mounted on a tool shank in a self-clamping manner, which is often obtained by forming the cutting head and the tool shank with locking sections such as disclosed, for example, in EP 0 118 806.

EP 0 118 806 discloses a replaceable cutting head and a tool shank coaxially coupled together and having locking sections in the form of a centrally disposed and axially extending dovetail-shaped protrusion in the cutting head and a correspondingly shaped recess in the tool shank, which protrusion and recess co-axially interact in a male-female fashion. The protrusion and the recess both have fixation wings which are circumferentially spaced apart so that, during assembling, the fixation wings of the protrusion are initially inserted between the fixation wings of the recess and, upon rotation of the cutting head relative to the tool holder, they reach their final position in which the fixation wings of the recess overlie the corresponding fixation wings of the protrusion. The cutting head and the tool shank are further provided with positioning sections located peripherally with respect to the locking sections and abutting each other upon the rotation of the cutting head relative to the tool shank, which results in the interlocking of the locking sections in their final position, whereby the self-clamping of the cutting head on the tool shank is provided.

In order to enable the above-described interaction between the fixation wings of the locking sections of the cutting head and the tool shank, contacting surfaces of these wings need to have at least small axial and radial gaps therebetween, which leads to the necessity of providing the cutting tool assembly with additional means for accurate mutual positioning of the locking sections. Such additional means may be, for example, in the form of a resilient slit formed in the tool shank, as described in WO96/11079.

It is the object of the present invention to provide a new cutting head and a new tool shank for use therewith which, inter alia, have advantages in the above respect.

SUMMARY OF THE INVENTION

In accordance with one aspect of the present invention, there is provided a replaceable cutting head for co-axial coupling thereof, along a coupling axis, with a tool shank in a self-clamping fashion, the cutting head having a cutting portion with at least one cutting edge formed adjacent a leading end thereof and a mounting portion extending between said cutting portion and a trailing end of the cutting head and mating with a mounting portion of the tool shank; said mounting portion of the cutting head comprising:

- a centering section having a peripheral centering surface which extends circumferentially with respect to said coupling axis and has a substantially conical shape at least at two portions thereof, which portions diverge along said axis towards a broad end of the peripheral centering surface;
- a positioning section having at least two peripherally disposed and circumferentially extending and spaced apart positioning surfaces adapted for the provision of an axial support of the cutting head on the tool shank, each positioning surface being inclined with respect to said coupling axis so that an axial distance therefrom to said broad end of the peripheral centering surface increases in a direction generally corresponding to the direction of cutting forces acting on said cutting edge during a cutting operation;
- one of the positioning and centering sections being formed with at least two circumferentially spaced apart fixation wings with, respectively, either said positioning surfaces and or said portions of the centering surface belonging thereto.

In accordance with another aspect of the present invention, there is provided a tool shank for a co-axial coupling thereof, along a coupling axis, with a replaceable cutting head having at least one cutting edge, in a self-clamping fashion, the tool shank having a mounting portion mating with a mounting portion of the cutting head formed adjacent a trailing end thereof; the mounting portion of the tool shank extending rearwardly from a front face of the tool shank and comprising:

- a centering section having a peripheral centering surface which extends circumferentially with respect to said coupling axis and has a substantially conical shape at least at two portions thereof, which portions diverge along said axis towards a broad end of the peripheral centering surface;
- a positioning section having at least two peripherally disposed and circumferentially extending and spaced apart positioning surfaces, each positioning surface being inclined with respect to said coupling axis so that an axial distance therefrom to said board end of the peripheral centering surface increases in a direction which generally corresponds to the direction of cutting forces acting on said cutting edge;
- one of the positioning and centering sections being formed with at least two circumferentially spaced apart fixation wings with, respectively, either said positioning surfaces or said portions of the centering surface belonging thereto.

Preferably, the mounting portion of the cutting head is an integral part of the cutting head's body with one of the positioning and centering sections of the mounting portion being disposed adjacent the cutting portion and the other one being disposed adjacent the trailing end of the cutting head and being formed with said fixation wings; the mounting portion of the tool shank being designed accordingly and at least its section formed with said fixation wings being in the form of an open-ended cavity.

During assembling of the cutting head and the tool shank of the present invention into a cutting tool, the fixation wings of the mounting portion of the cutting head are inserted between the fixation wings of the mounting portion of the tool shank and, upon rotation of the cutting head relative to the tool shank around the coupling axis, the positioning surfaces of the mounting portion of one of them climb and abut the positioning surfaces of the mounting portion of the other, thereby bringing the centering surface of the mounting portion of the cutting head into a tight fit and abutment with the corresponding centering surface of the mounting portion of the tool shank, providing thereby the interlocking of the mounting portions of the cutting head and the tool shank in a male-female fashion. Thereby, the self-clamping of the cutting head on the tool shank is achieved.

The inclined positioning surfaces of the mounting portions of the cutting head and the tool shank may have any shape suitable for the provision of a gradual screw-like attachment of the cutting head to the tool shank. Preferably, these surfaces are formed as sections of a helical surface with a helix angle defining their inclination relative to the coupling axis.

According to one embodiment of the present invention, the fixation wings are formed on the centering section of the mounting portion of the cutting head which is disposed adjacent the trailing end thereof, the centering surface being defined by peripheral surfaces of the fixation wings. In this case, the positioning section is disposed between the cutting portion of the cutting head and the centering section of its mounting portion, and the positioning surfaces belong to wedge-shaped protrusions formed on a base surface of the positioning section.

In another embodiment of the present invention, the centering section is disposed adjacent the cutting portion and is, preferably, in the form of an elongated conical body, and the fixation wings belong to the positioning section of the mounting portion of the cutting head, each fixation wing having the positioning surface disposed adjacent the centering section and a peripheral surface extending axially between the positioning surface and the trailing end of the cutting head.

Preferably, the cutting head and the tool shank are designed to be coupled in a cutting tool assembly for use in rotary operations, in which the coupling axis coincides with an axial of rotation of the cutting tool assembly.

With the design of the mounting portions of the cutting head and the tool shank according to the present invention, the interaction of their inclined positioning surfaces during assembly of the cutting tool provides for a tight fit of the centering surfaces thereof in an accurately established mutual axial and radial position. Consequently, the cutting head is accurately centered and retained in the tool holder in a self-clamping manner.

BRIEF DESCRIPTION OF THE DRAWINGS

For a better understanding of the present invention and to show how the same may be carried out in practice, reference will now be make to the accompanying drawings, in which.

DESCRIPTION OF THE PREFERRED EMBODIMENTS

Figure 1:
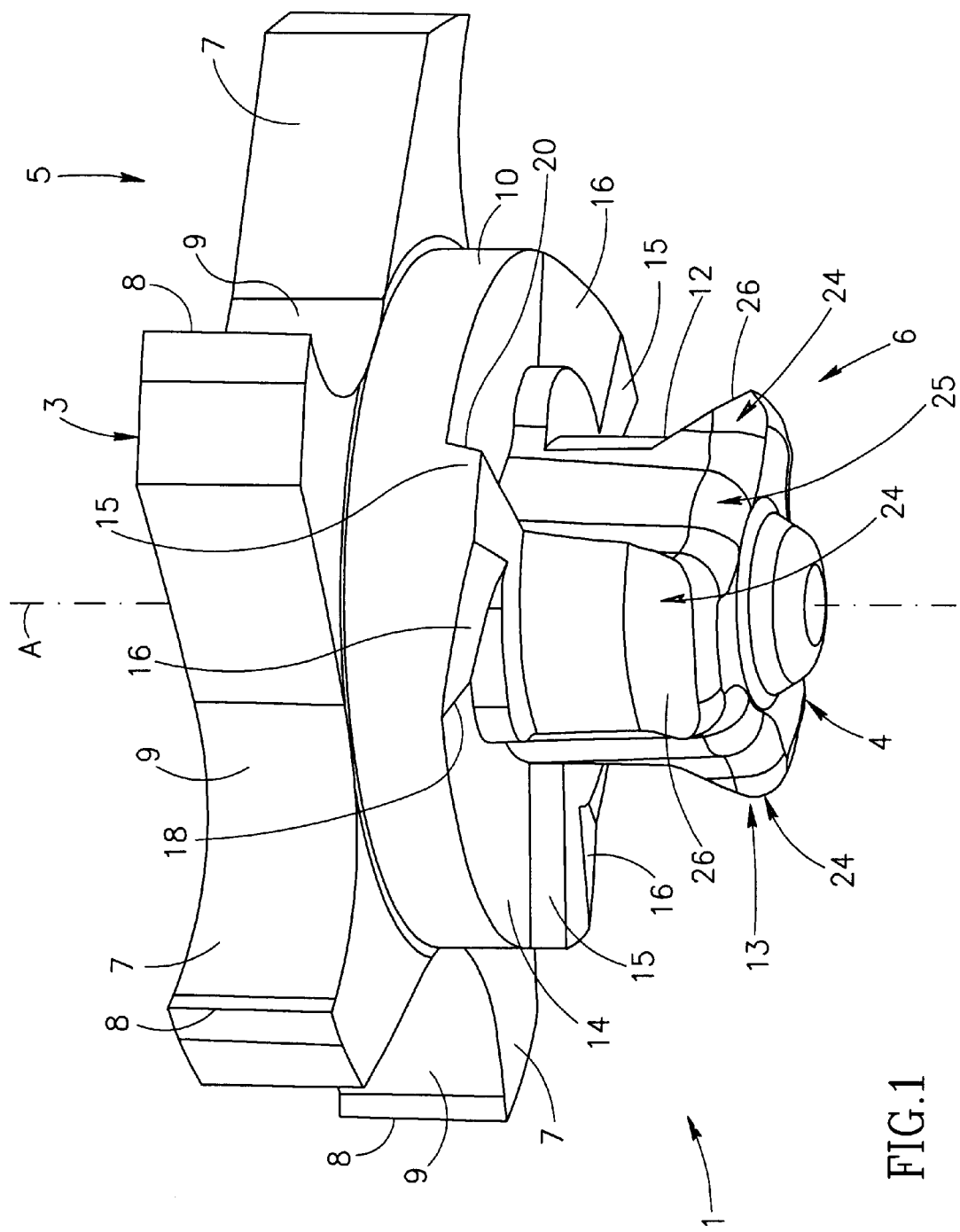
FIG. 1 is an isometric view of a cutting head according to a first embodiment of the present invention.
Figure 2:
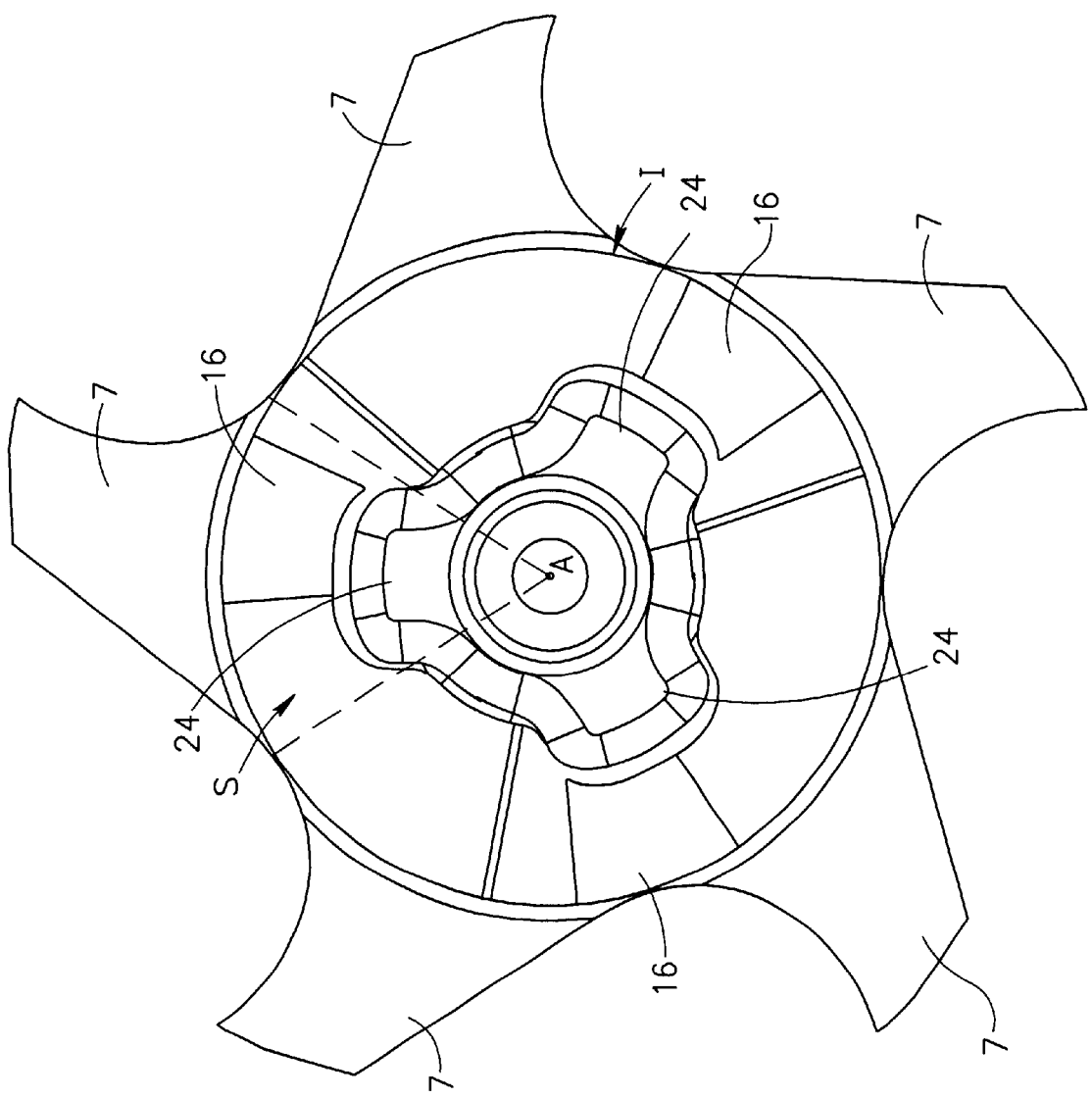
FIG. 2 is a plan bottom view of the cutting head shown in FIG. 1.
Figure 3:
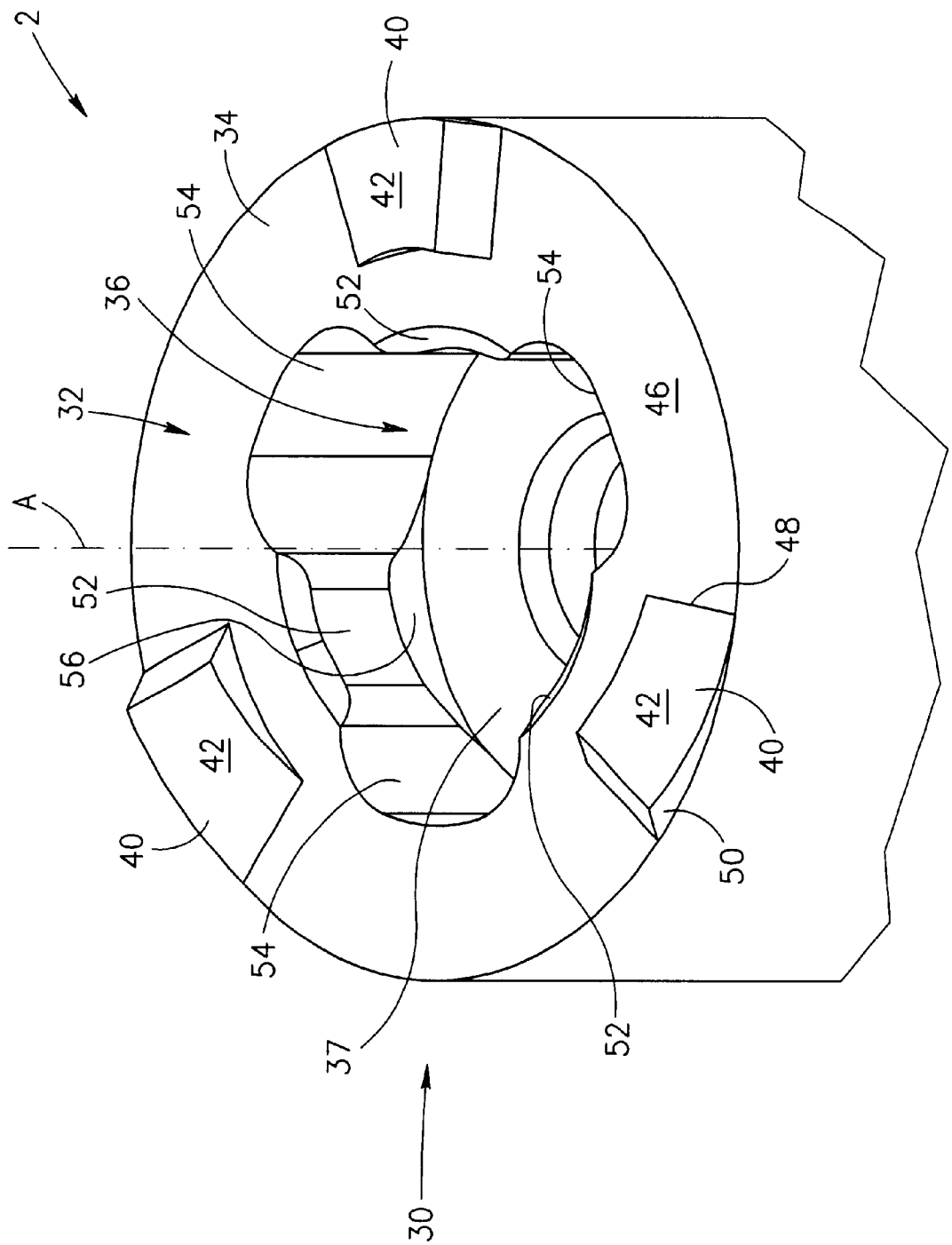
FIG. 3 is an isometric view of a tool shank according to a first embodiment of the present invention.
Figure 4:
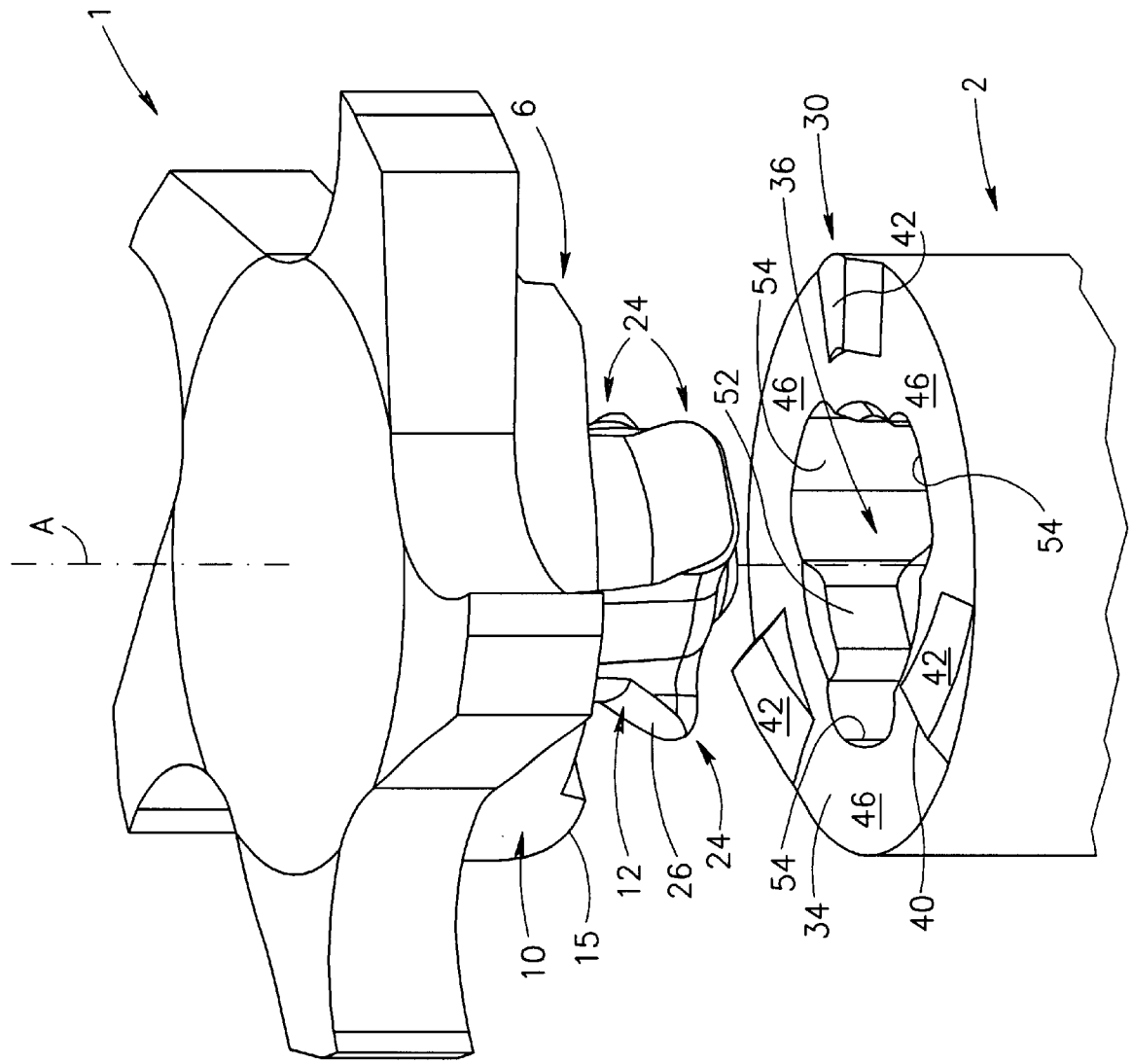
FIG. 4 is an isometric exploded view of a cutting tool assembly comprising the cutting head shown in FIG. 1 and the tool shank shown in FIG. 3.
Figure 5:
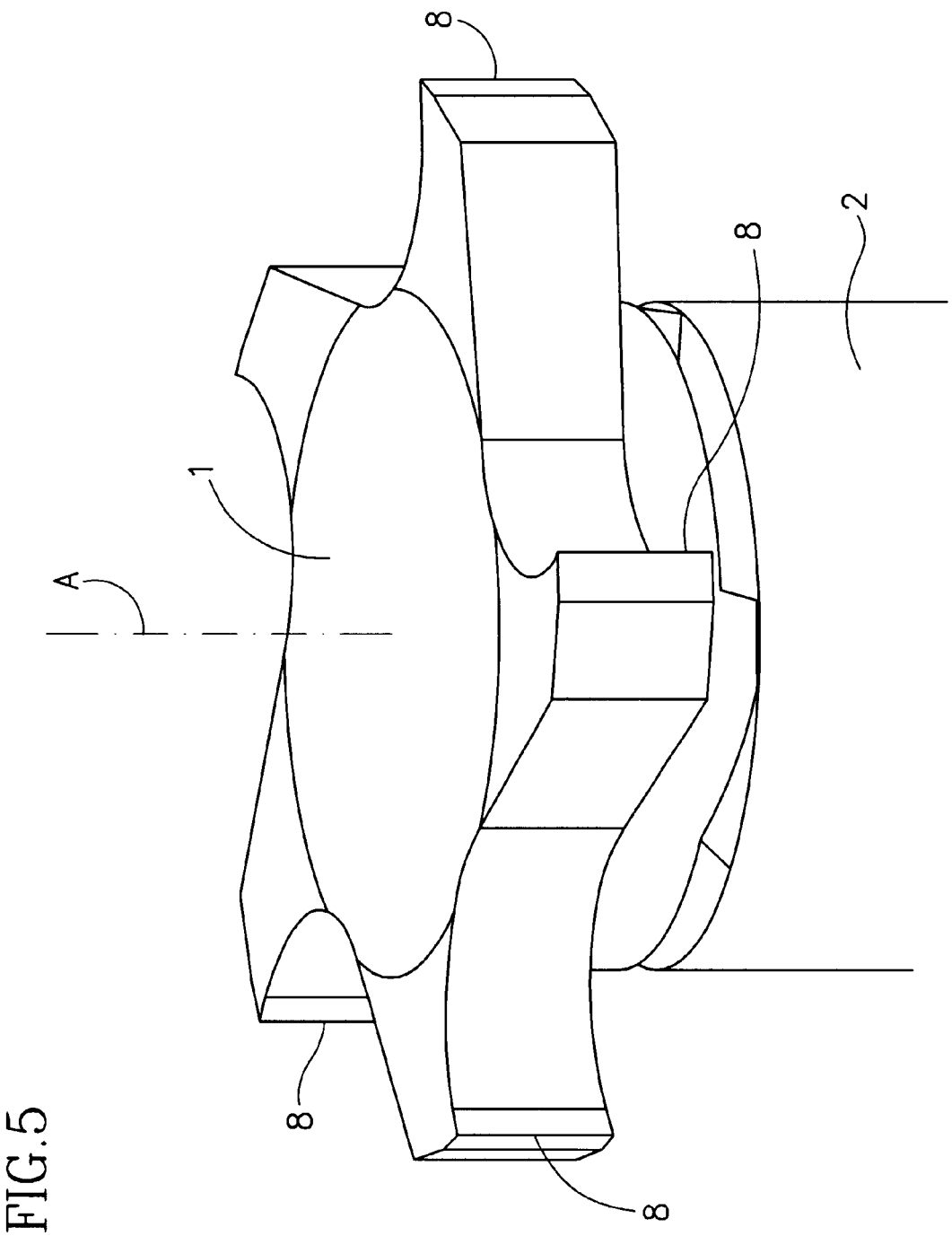
FIG. 5 is an isometric view of the cutting tool assembly shown in FIG. 4, when assembled.

FIGS. 1 and 2 illustrate a replaceable cutting head 1 designed, in accordance with one embodiment of the present invention, to be co-axially coupled with a tool shank 2 illustrated in FIG. 3 for providing a cutting tool assembly illustrated in FIGS. 4 and 5 for use in slotting operations.

As seen in FIG. 1, the cutting head 1 has a leading end 3 and a trailing end 4 and is formed with a front cutting portion 5 and a trailing mounting portion 6 extending rearwardly therefrom The front cutting portion 5 of the cutting head 1 has a plurality of body portions 7 formed with cutting edges 8 and separated by chip evacuation recesses 9. The cutting edges 8 are directed substantially parallel to an axis A around which the cutting head 1 is designed to rotate. The cutting geometry of the front cutting portion 5 does not constitute the subject matter of the present application and, therefore, is not described herein in detail.

The trailing mounting portion 6 of the cutting head 1 comprises a cylindrical positioning section 10 disposed adjacent the cutting portion 5 and having a circumference I inscribed in the cutting portion 5 (FIG. 2), and a centering section 12 extending between the positioning section 10 and the trailing end 4 of the cutting head 1 and generally diverging towards a broad end 13 thereof disposed adjacent the trailing end 4 of the cutting head 1.

The positioning section 10 has a base surface 14 oriented substantially perpendicular to the axis A and formed with wedge-like protrusions 15 which are disposed peripherally and which extent and are spaced apart in a substantially circumferential direction. The protrusions 15 have positioning surfaces 16, each being formed as a section of a helical surface inclined with respect to the axis A and extending so that an axial distance therefrom to the broad end 13 of the centering section 12 increases in a direction generally corresponding to the direction of cutting forces acting on the cutting edges 8 during a cutting operation. Each positioning surface 16 continuously merges with the base surface 14 at a leading end 18 of the protrusion 15 and forms a step relative to the base surface 14 at a trailing end 20 thereof.

The centering section 12 is substantially elongated in the axial direction and is formed with circumferentially spaced apart fixation wings 24 separated by recessed portions 25. The fixation wings 24 are axially spaced from the wedge-like protrusions 15. With reference to FIG. 2, each fixation wing 24 and a corresponding positioning surface 16 of the positioning section 10, as seen in the plan view, are disposed in one and the same sector S of the circumference I of the positioning surface 10. The fixation wings 24 are formed with peripheral centering surfaces 26, each being a part of a common imaginary conical surface generally defining a peripheral centering surface of the centering section 12 diverging in the direction away from the positioning section 10 towards the board end 13 of the centering section 12. In the described embodiment, the axial extension of the centering surface 26 is less than that of the centering section 12, however they also may be co-extensive therewith.

FIG. 3 shows the tool shank 2 with which the cutting head 1 described above is adapted to be coupled. As seen, the tool shank 2 has a mounting portion 30 comprising a positioning section 32 disposed at a front face 34 of the tool shank and a centering section 36 in the form of an open-ended cavity extending from the front face 34 of the tool shank 2 to a rearward end 37 thereof along the axis A around which the tool shank 2 is designed to rotate during a cutting operation.

The front face 34 of the tool shank 2 is oriented substantially perpendicular to the axis A and is adapted to interact with the base surface 14 of the positioning section 10 of the cutting head 1. The front face 34 is formed with wedge-like protrusions 40 which are disposed peripherally and which extend in a substantially circumferentially direction of the tool shank 2. The protrusions 40 comprise positioning surfaces 42 having a shape corresponding to the shape of the positioning surfaces 16 of the wedge-like protrusions 15 of the cutting head, and inclined with respect to the axis A at a corresponding inclination angle. As seen in FIG. 3, the positioning surfaces 42 are oriented so that an axial distance therefrom to the rear end 37 of the centering section 36 increases in a direction generally corresponding to the direction of cutting forces acting on the cutting edges 8 during a cutting operation. Each positioning surface 42 continuously merges with an adjacent non=protruding portion 46 of the front face 34 at a leading end 48 of the protrusion 40 and forms a step relative to an adjacent non-protruding portion 46 of the front face 34 at a trailing end 50 thereof.

The centering section 36 of the mounting portion 30 of the tool shank 2 is of a shape mating the shape of the centering section 12 of the mounting portion 6 of the cutting head 1. Thus, the centering section 36 is substantially elongated in the axial direction and is formed with fixation wings 52 separated by recessed portions 54 capable of receiving therein the fixation wings 24 of the centering section 12 of the cutting head 1. The fixation wings 52 are axially spaced from the wedge-like protrusions 40. The fixation wings 52 are formed with peripheral centering surfaces 56 (only one being seen in FIG. 3) each forming a part of a common imaginary conical surface generally defining a peripheral centering surface of the centering section 36 having its broad end at the rear end 37 of the centering section 36.

With reference to FIG. 4, the cutting head 1 is coupled with the tool shank 2 by the insertion of the centering section 12 of the mounting portion 6 of the cutting head 1 into the centering section 36 of the mounting portion 30 of the tool shank 2, with the fixation wings 24 of the centering section 12 being received in the recessed portions 54 of the centering section 36 and with the wedge-like protrusions 15 of the positioning section 10 of the cutting head overlying the non-protruding portions 46 of the front face 34 of the tool shank 2. Upon rotation of the cutting head 1 relative to the tool shank 2 around the axis A in a direction opposite to the direction of rotation thereof during a cutting operation, the positioning surfaces 16 (seen in FIG. 1) of the wedge-like protrusions 15 climb the positioning surfaces 42 of the wedge-like protrusions 40. This causes the fixation wings 24 of the centering section 12 of the cutting head 1 to start passing under the fixation wings 52 of the centering section 36 of the tool shank 2 so that, when the positioning surfaces 16 abut the positioning surfaces 42, the centering surfaces 26 of the fixation wings 24 tightly fit and abut the corresponding centering surfaces 56 of the fixation wings 52. Thereby, the centering sections 12 and 36 of the respective mounting portions 6 and 30 of the cutting head 1 and the tool shank 2 are interlocked in a male-female fashion and, consequently, the cutting head 1 is self-clamped on the tool shank 2.

FIG. 5 illustrates the cutting head 1 and the tool shank 2 when assembled into a cutting tool. During a cutting operation of the cutting tool, the interacting inclined positioning surfaces 16 and 42 of the cutting head 1 and the tool shank 2, respectively, serve for both an axial support of the cutting head 1 on the tool shank 2 and also for torque transmission therebetween which is obtained due to the inclination of these positioning surfaces. By virtue of the specifically chosen direction of the inclination of the positioning surfaces 16 and 42, the cutting forces acting, during the cutting operation, on the cutting edge 8 of the cutting head 1 facilitate the self-clamping of the cutting head 1 on the tool shank 2.

Figure 6:
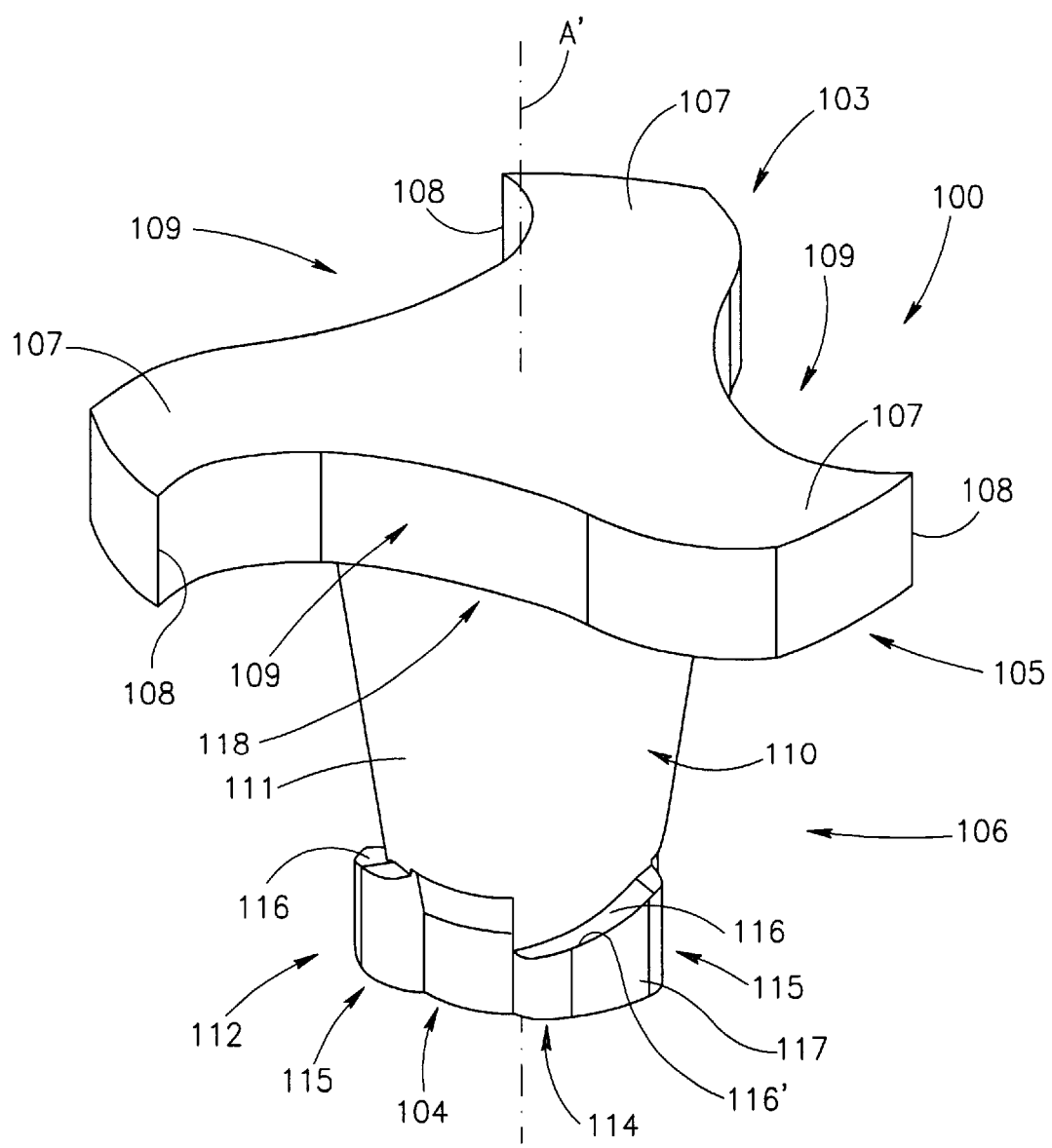
FIG. 6 is an isometric view of a cutting head according to a second embodiment of the present invention.
Figure 7:
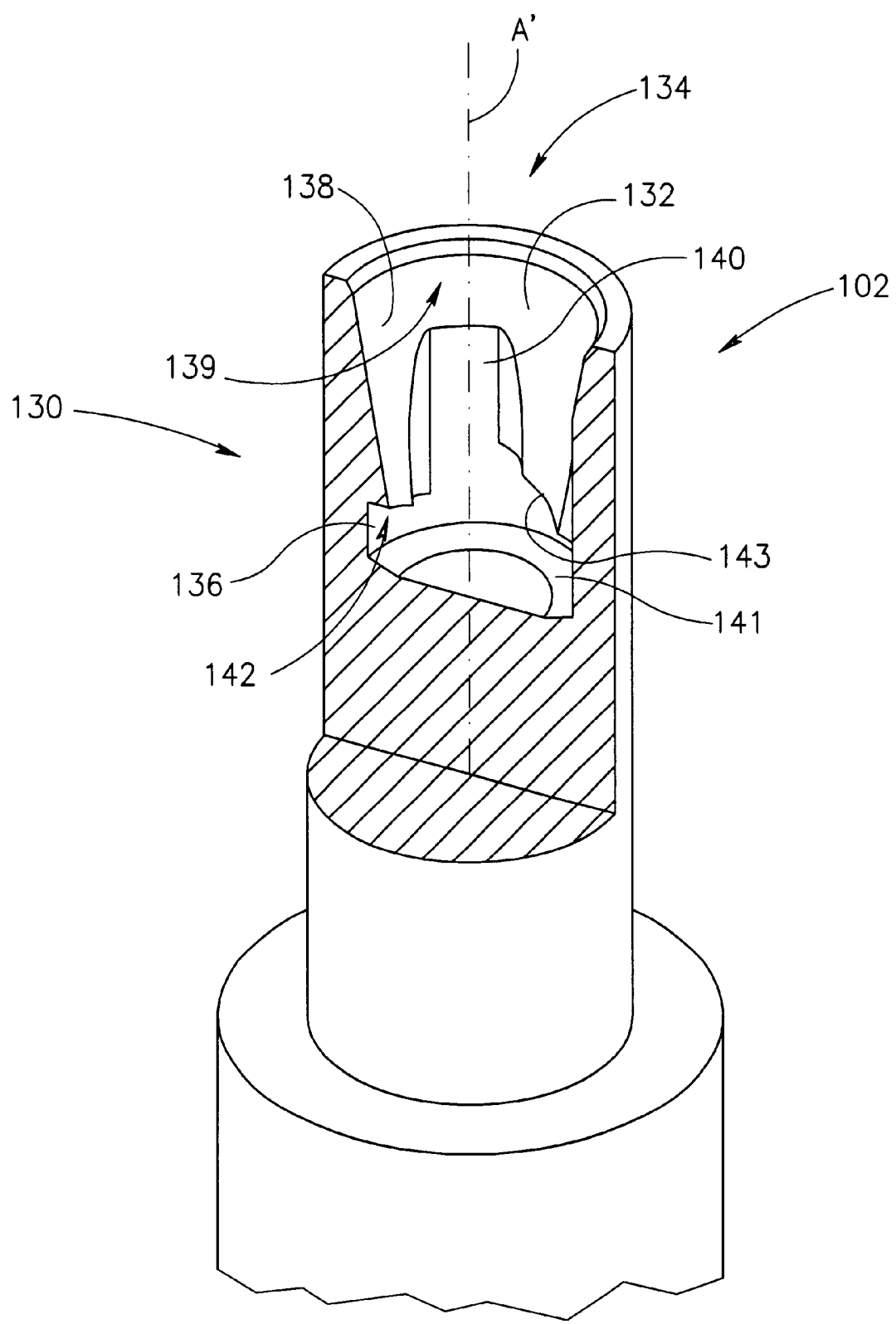
FIG. 7 is an isometric cutaway view of a tool shank according to a second embodiment of the present invention.
Figure 8:
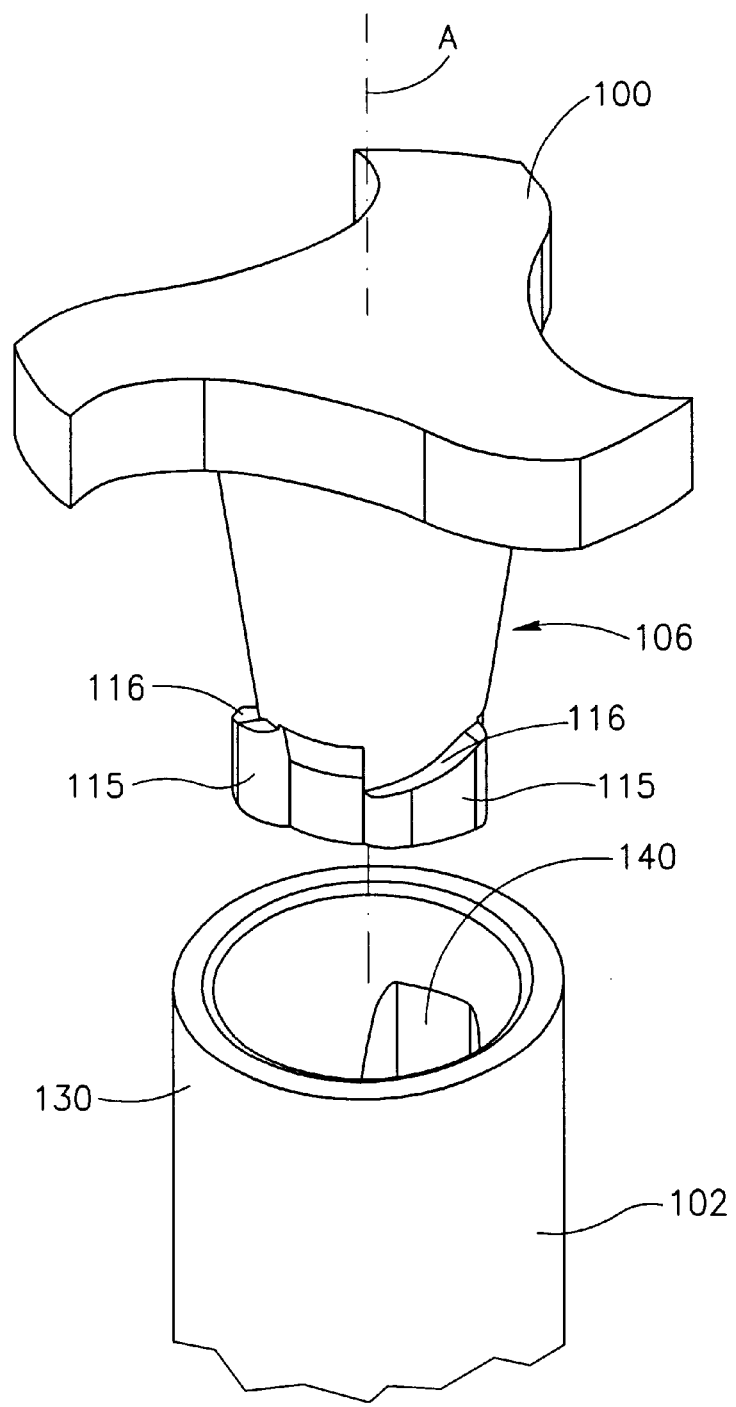
FIG. 8 is an isometric exploded view of a cutting tool assembly comprising the cutting head shown in FIG. 6 and the tool shank shown in FIG. 7.
Figure 9:
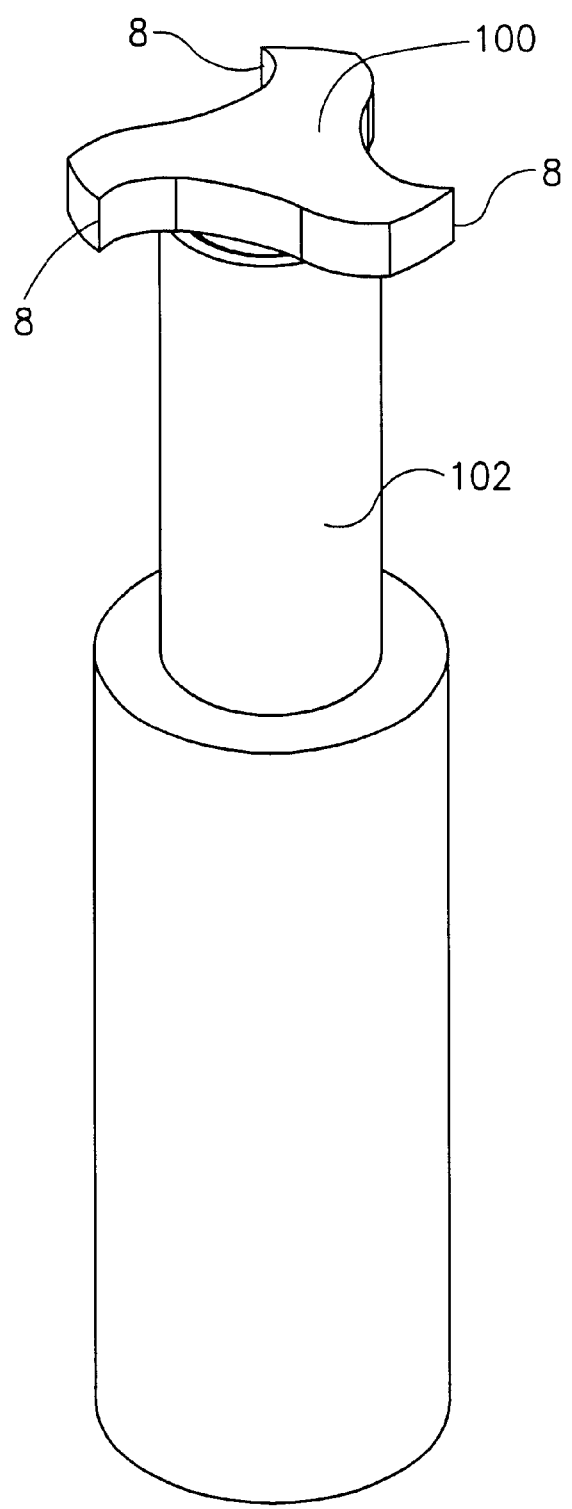
FIG. 9 is an isometric view of the cutting tool assembly shown in FIG. 8, when assembled.

FIG. 6 illustrates a replaceable cutting head 100 designed, in accordance with another embodiment of the present invention, to be co-axially coupled with a tool shank 102 illustrated in FIG. 7 for providing a cutting tool assembly illustrated in FIGS. 8 and 9 for use in slotting operations.

As seen in FIG. 6, the cutting head 100 has a leading end 103 and a trailing end 104 and is formed with a front cutting portion 105 and a trailing mounting portion 106 extending rearwardly therefrom.

The front cutting portion 105 of the cutting head 100 has a plurality of body portions 107 formed with cutting edges 108 and separated by chip evacuation recesses 109. The cutting edges 108 are directed substantially parallel to an axis A' around which the cutting head 100 is designed to rotate, during a cutting operation.

The trailing mounting portion 106 of the cutting head 100 comprises a centering section 110 disposed adjacent the cutting portion 105, and a positioning section 112 extending between the centering section 110 and the trailing end 104 of the cutting head 100.

The centering section 110 is a conical body substantially elongated in the axial direction and diverging in the direction towards the front cutting portion 105 of the cutting head 100. The centering section 110 has a peripheral centering surface 111 of a diameter which, at a broad end 118 thereof, substantially equals the diameter of a circle inscribed in the cutting portion 105 (not shown).

The positioning section 112 is formed with fixation wings 115 having positioning surfaces 116 oriented transversely to the axis A' and peripheral surfaces 117 extending axially. The fixation wings 115 protrude radially outwardly from a narrow end of the centering section 110 so that a distance from the axis A' to radially outermost portions 116' of the positioning surfaces 116 is substantially less than the radius of the peripheral centering surface 111 at the broad end 118 thereof. The positioning surfaces 116 of the fixation wings 115 are inclined with respect to the axis A' so that an axial distance therefrom to the broad end 118 of the centering section 110 increases in a direction which generally corresponds to the direction of cutting forces acting on the cutting edges 108 during a cutting operation. Similarly, to the positioning surfaces 16 of the cutting head 1, the positioning surfaces 116 are each formed as a section of a helical surface having a helix angle corresponding to the angle of inclination of the positioning surfaces 116.

FIG. 7 shows the tool shank 102 with which the cutting head 100 described above is adapted to be coupled. As seen, the tool shank 102 has a mounting portion 130 in the form of an elongated open-ended cavity extending along the axis A' around which the tool shank 102 is designed to rotate and adapted to receive therein the mounting portion 106 of the cutting head 100. The mounting portion 130 comprises a centering section 132 disposed adjacent a front face 134 of the tool shank 102 and a positioning section 136 extending from the centering section 132 in a rearward direction of the tool shank 102.

The centering section 132 of the mounting portion 130 of the tool shank 102 comprises a substantially conical peripheral centering surface 138 having a broad end 139 adjacent the front face 134 of the tool shank 102. The peripheral centering surface 138 is formed with elongated recesses 140 having a circumferential extension of at least that of the fixation wings 115 and a radial extension increasing gradually in the rearward direction of the tool shank 102 so as to enable a free passage of the fixation wings into the positioning section 136 of the mounting portion 130.

The positioning section 136 comprises a base surface 141 and fixation wings 142 located between the recesses 140 and having positioning surfaces 143 inclined with respect to the axis A' so that an axial distance between the positioning surface 143 and the broad end 139 of the peripheral centering surface 138 increases in a direction generally corresponding to the direction of cutting forces acting on the cutting edges 108 of the cutting head 100 during a cutting operation (FIG. 8). Similarly to the positioning surfaces 116 of the cutting head 100, the positioning surface 143 are formed as sections of a helical surface and their inclination angle is equal to that of the positioning surface 116.

With reference to FIG. 8, the cutting head 100 is coupled with the tool shank 102 by the insertion of the mounting portion 106 of the cutting head into the mounting portion 130 of the tool shank, with the fixation wings 115 of the positioning section 112 of the former mounting portion passing, by means of the recesses 140 in the peripheral centering surface 138, into the positioning section 136 of the latter mounting portion. Upon rotation of the cutting head 100 relative to the tool shank 102 around the axis A' in the direction opposite to the direction of rotation thereof during a cutting operation, the positioning surfaces 143 of the fixation wings 142 of the tool shank 102 climb the positioning surfaces 116 of the fixation wings 115 of the cutting head 100. This causes the centering section 110 of the cutting head 100 to be pulled further into the centering section 132 of the tool shank 102 until their peripheral centering surfaces 111 and 138 tightly fit and abut each other. Thereby, the mounting portions 106 and 130 of the cutting head 100 and the tool shank 102, respectively, are interlocked in a male-female fashion and, consequently, self-clamping of the cutting head 1 on the tool shank 2 is obtained.

FIG. 9 illustrates the cutting head 100 and the tool shank 102 when assembled in a cutting tool. During a cutting operation of the cutting tool, the interacting centering surfaces 111 and 138 (not seen) of the cutting head 100 and the tool shank 102, respectively, serve for both centering the cutting head 100 with respect to the tool shank 102 and also for torque transmission therebetween. An axial support of the cutting head 100 on the tool shank 102 is obtained by the interacting inclined positioning surfaces 116 and 143 (not seen) which also take part in the torque transmission. By virtue of the specifically chosen direction of the inclination of the positioning surfaces 116 and 143, the cutting forces acting on the cutting edges 108 of the cutting head 100 during the cutting operation, facilitate the self-clamping of the cutting head 100 on the tool shank 102.

The design of a cutting head and a tool shank according to the present invention and, particularly, the fact that the positioning surfaces thereof are inclined, provided the inclination angles are chosen so as to ensure that the friction between these surfaces is sufficient to keep them in their mutual abutment when the cutting head and the tool shank are coupled together, allows for the tight fit of the centering surfaces of the cutting head and the tool shank in an accurately established mutual axial and radial position. Consequently, the cutting head is accurately centered and retained in the respective tool holders in a self-clamping manner.

A cutting head and a tool shank according to the present invention may have geometries different from those described in the preferred embodiments and shown in the drawings. They may be used in cutting tool assemblies adapted for cutting operations other than slotting and may not require that the coupling axis be located centrally of the cutting tool assembly. The positioning surfaces may be planar or curved, and may have any shape suitable for the provision of a gradual screw-like attachment of the cutting head to the tool shank. The positioning and centering sections of the cutting head and the tool shank and their positioning and centering surfaces may have any appropriate mutual disposition.

LIST OF REFERENCE NUMERALS:

| | |
|---|---|
| 1 | cutting head in FIG. 1 |
| 2 | tool shank in FIG. 3 |
| 3 | leading end of the cutting head 1 |
| 4 | trailing end of the cutting head 1 |
| 5 | front cutting portion of the cutting head 1 |
| 6 | trailing mounting portion of the cutting head 1 |
| 7 | body portion of the cutting portion 5 |
| 8 | cutting edge |
| 9 | chip evaluation recess |
| 10 | positioning section of the mounting portion 6 |
| 12 | centering section of the mounting portion 6 |
| 13 | broad end of the centering section 12 |
| 14 | base surface of the positioning section 10 |
| 15 | wedge-like protrusion of the positioning section 10 |
| 16 | positioning surface |
| 18 | end of the wedge-like protrusion 15 |
| 20 | end of the wedge-like protrusion 15 |
| 24 | fixation wing |
| 26 | conical surface of the fixation wing 24 |
| 30 | mounting portion of the tool shank 2 |
| 32 | positioning section of the mounting portion 30 |
| 34 | front face 34 of the tool shank 2 |
| 36 | centering section of the mounting portion 30 |
| 37 | rear end of the centering section 36 |
| 40 | wedge-like protrusion of the positioning section 32 |
| 42 | positioning surface |
| 46 | non-protruding portion of the front face 34 |
| 48 | end of the protrusion 40 |
| 50 | end of the protrusion 40 |
| 52 | fixation wing |
| 54 | recessed portion in the centering section 36 |
| 56 | positioning surface |
| 100 | cutting head in FIG. 6 |
| 102 | tool shank in FIG. 7 |
| 103 | leading end of the cutting head 100 |
| 104 | trailing end of the cutting head 100 |
| 105 | front cutting portion of the cutting head 100 |
| 106 | trailing mounting portion of the cutting head 100 |
| 107 | body portion of the cutting portion 105 |
| 108 | cutting edge |
| 109 | chip evacuation recess |
| 110 | centering section of the mounting portion 106 |
| 111 | peripheral centering surface |
| 112 | positioning section of the mounting portion 106 |
| 114 | base surface of the positioning section 112 |
| 115 | fixation wing |
| 116 | positioning surface of the fixation wing 115 |
| 116' | radially outermost portion of the positioning surface 116 |
| 117 | peripheral surface of the fixation wing 115 |
| 118 | broad end of the peripheral centering surface 111 |
| 130 | mounting portion of the tool shank 102 |
| 132 | centering section of the mounting portion 130 |
| 134 | front face of the tool shank |
| 136 | positioning section of the mounting portion 130 |
| 138 | peripheral centering surface |
| 139 | broad end of the peripheral centering surface 138 |
| 140 | recess in the peripheral centering surface 138 |
| 141 | base surface |
| 142 | fixation wing |
| 143 | positioning surface |
| A | axis of the cutting head 1 and the tool shank 2 |
| A' | axis of the cutting head 100 and the tool shank 102 |
| I | circumference of the positioning section 10 of the cutting head 1 |
| S | sector of the inscribed circle I |

What is claimed is:

1. A replaceable cutting head for co-axial coupling with a tool shank in a self-clamping fashion along a coupling axis to form a cutting tool assembly for rotary cutting operations, the cutting head having a cutting portion with at least one cutting edge formed adjacent a leading end thereof and a mounting portion extending between said cutting portion and a trailing end of the cutting head for mating with a mounting portion of the tool shank, the coupling axis forming an axis of rotation of the cutting head and the tool shank about which each rotate in a given direction of rotation during a cutting operation, said mounting portion of the cutting head comprising:

a positioning section, adjacent said cutting portion, having a base surface oriented substantially perpendicularly to the axis of rotation and formed with wedge-like protrusions which are disposed peripherally and which extend and are spaced apart in a substantially circumferential direction, each wedge-like protrusion has a positioning surface, inclined with respect to the coupling axis, for the provision of axial support of the cutting head on the tool shank;

a centering section extending rearwardly from the positioning section to the trailing end of the cutting head and generally diverging towards a broad end of the centering section disposed adjacent the trailing end of the cutting head, the centering section being substantially elongated in the axial direction and being formed with circumferentially spaced apart fixation wings separated by recessed portions, the fixation wings being axially spaced from the wedge-like protrusions, each fixation wing being formed with a peripheral centering surface, the peripheral centering surfaces being part of a common imaginary conical surface generally defining a peripheral centering surface of the centering section, the imaginary conical surface diverging rearwardly towards the broad end of the centering section.

2. A replaceable cutting head according to claim 1, wherein an axial distance from each positioning surface to said broad end of the centering section decreases in said given direction of rotation.

3. A replaceable cutting head according to claim 1, wherein each positioning surface is formed as a section of a helical surface inclined with respect to said coupling axis.

4. A replaceable cutting head according to claim 1, wherein each positioning surface continuously merges with the base surface at a leading end of the respective protrusion and forms a step relative to the base surface at a trailing end of the respective protrusion.

5. A tool shank for co-axial coupling with a replaceable cutting head in a self-clamping fashion along a coupling axis to form a cutting tool assembly for rotary cutting operations, the cutting head having at least one cutting edge, the tool shank having a mounting portion mating with the mounting portion of the cutting head formed adjacent a trailing end thereof, the coupling axis forming an axis of rotation of the cutting head and of the tool shank about which each rotate in a given direction of rotation during a cutting operation, said mounting portion of the tool shank comprising:

a positioning section, disposed at front face of the tool shank, said front face being oriented substantially perpendicularly to the axis of rotation and formed with wedge-like protrusions which are disposed peripherally and which extend and are spaced apart in a substantially circumferential direction, each wedge-like protrusion having a positioning surface, inclined with respect to the coupling axis, for the provision of axial support of the cutting head on the tool shank;

a centering section in the form of an open-ended cavity extending rearwardly from the front face of the tool shank to a rear end of the tool shank along the axis of rotation, the centering section being substantially elongated in the axial direction and being formed with circumferentially spaced apart fixation wings separated by recessed portions, the fixation wings being axially spaced from the wedge-like protrusions, each fixation wing being formed with a peripheral centering surface, the peripheral centering surfaces being part of a common imaginary conical surface generally defining a peripheral centering surface of the centering section, the imaginary conical surface diverging rearwardly towards the rear end of the centering section.

6. A tool shank according to claim 5, wherein an axial distance from each positioning surface to said rear end of the centering section decreases in said given direction of rotation.

7. A tool shank according to claim 5, wherein each positioning surface is formed as a section of a helical surface inclined with respect to said coupling axis.

8. A tool shank according to claim 5, wherein each positioning surface continuously merges with an adjacent non-protruding portion of the front face at a leading end of the respective protrusion and forms a step relative to an adjacent non-protruding portion at a trailing end of the respective protrusion.

9. A replaceable cutting head for co-axial coupling thereof, along a coupling axis, with a tool shank in a self-clamping fashion, the cutting head having a cutting portion with at least one cutting edge formed adjacent a leading end thereof and a mounting portion extending between said cutting portion and a trailing end of the cutting head and mating with a mounting portion of the tool shank; said mounting portion of the cutting head comprising:

a centering section having a peripherally centering surface which extends circumferentially with respect to said coupling axis and has a substantially conical shape on at least two portions thereof, which portions diverge along said axis towards a broad end of the peripheral centering surface;

a positioning section having at least two peripherally disposed and circumferentially extending and spaced apart positioning surfaces adapted for the provision of an axial support of the cutting head on the tool shank, each positioning surface being inclined with respect to said coupling axis so that an axial distance therefrom to said broad end of the peripheral centering surface increases in a direction generally corresponding to a direction of cutting forces acting on said at least one cutting edge during a cutting operation;

one of the positioning and centering sections being formed with at least two circumferentially spaced apart fixation wings with, respectively, either said positioning surfaces and/or said portions of the centering surface belonging thereto, wherein said mounting portion of the cutting head is an integral part of a central body portion of the cutting head with the fixation wings being disposed adjacent the trailing end of the cutting head, and said positioning surfaces belong to wedge-shaped protrusions formed on a base surface, each positioning surface continuously merging with the base surface at a circumferentially leading end of one of said wedge-shaped protrusions and forming a step relative to the base surface at a circumferentially trailing end of said one of said wedge-shaped protrusions.

* * * * *